United States Patent [19]

Ishikawa et al.

[11] 3,844,256
[45] Oct. 29, 1974

[54] INTAKE PASSAGE-WAY OF A ROTARY INTERNAL COMBUSTION ENGINE

[75] Inventors: Yoshikazu Ishikawa; Kazuaki Kobayashi, both of Tokyo, Japan

[73] Assignee: Nissan Motor Company, Kanagawa-ku, Yokohama City, Japan

[22] Filed: Oct. 17, 1972

[21] Appl. No.: 298,448

[30] Foreign Application Priority Data
Oct. 18, 1971  Japan .............................. 46-96057
Apr. 3, 1972  Japan .............................. 47-39338

[52] U.S. Cl. ............................................. 123/8.45
[51] Int. Cl. ............................................. F02b 53/00
[58] Field of Search ...................... 123/8.01, 8.45

[56] References Cited
UNITED STATES PATENTS
3,244,153  4/1966  Froede .............................. 123/8.45
3,347,213  10/1967  Froede .............................. 123/8.45
3,514,235  5/1970  Yamauchi .................. 123/8.45 UX FOREIGN PATENTS OR APPLICATIONS
1,194,656  6/1970  Great Britain ...................... 123/8.01

Primary Examiner—C. J. Husar
Assistant Examiner—Michael Koczo, Jr.

[57] ABSTRACT

An intake passageway for a rotary internal combustion engine having a housing provided with an epitrochoidal internal wall defining a cavity and a rotor rotatably disposed in the cavity and having a peripheral surface with a plurality of circumferentially spaced apex portions sealingly engaging with the epitrochoidal internal wall of the housing to define a plurality of working chambers, which intake passageway includes a plurality of partitions disposed in an opening portion of the intake passageway substantially in parallel to the flow of an air-fuel mixture passing therethrough for preventing engine exhaust gases from being sucked into one of the plurality of working chambers into which the air-fuel mixture is supplied. The intake passageway further includes valve means for controlling the effective cross sectional area of the opening portion of the intake passageway.

5 Claims, 11 Drawing Figures

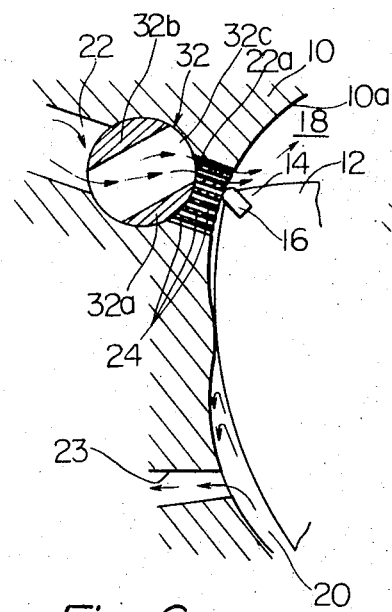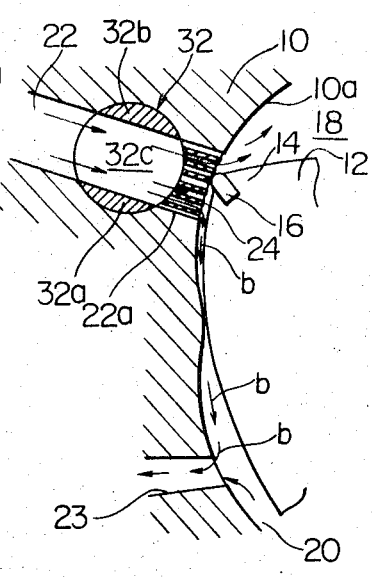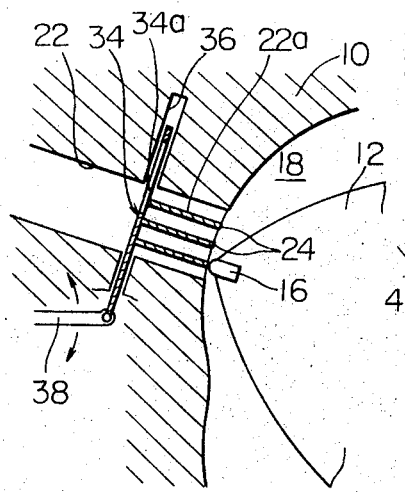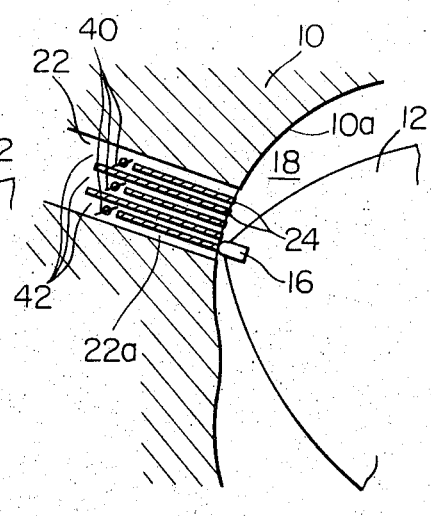

INTAKE PASSAGE-WAY OF A ROTARY INTERNAL COMBUSTION ENGINE

This invention relates to rotary internal combustion engines and, more particularly, to an improvement over an intake passage-way of a rotary internal combustion engine.

In general, rotary internal combustion engines comprise a housing having formed therein an epitrochoidal internal wall and a rotor rotatably disposed in the housing on an eccentric portion of a shaft which is journaled by bearings in the end walls of the housing. The rotor has a peripheral surface with a plurality of circumferentially spaced apex portions adapted for sealing engagement with the epitrochoidal internal wall of the housing to form a plurality of working chambers which vary in volume during engine operation. The rotary internal combustion engines also comprise an intake passage-way for administering an air-fuel mixture to one of the variable volume working chambers, an exhaust passageway communicating with one of the working chambers, and suitable ignition means so that during engine operation the working chambers of the engine undergo a cycle of operation which includes the four phases of intake, compression, expansion, and exhaust. In the operation of the rotary internal combustion engine of this kind, overlapping takes place in which the intake passageway communicates with the exhaust passageway due to its inherent construction. Under these conditions, the exhaust gases discharged into the exhaust passageway are sucked into the working chamber commencing its intake phase, thus mixing with an air-fuel mixture in the working chamber so that not only the combustion efficiency of the engine is decreased but also unburned exhaust gases are emitted to the atmosphere in high concentration thereby polluting the air seriously.

It is, therefore, an object of the present invention to provide an improved intake passageway for a rotary internal combustion engine which obviates by simple means the shortcomings encountered in the prior art construction.

Another object of the present invention is to provide an improved intake passageway for a rotary internal combustion engine by which a highly improved combustion efficiency is obtained.

Another object of the present invention is to provide an improved intake passageway for a rotary internal combustion engine which is adapted to increase the operating performance efficiency of the engine.

Still another object of the present invention is to provide an improved intake passageway for a rotary internal combustion engine which is adapted to reduce the amounts of unburned noxious and harmful compounds in exhaust gases emitted from the engine.

Still another object of the present invention is to provide an improved intake passageway for a rotary internal combustion engine which is adapted to prevent engine exhaust gases from being sucked into the suction chamber of the engine for supplying the engine only with a combustible air-fuel mixture thereby to improve the operating performance efficiency of the engine.

A further object of the present invention is to provide an improved intake passageway for a rotary internal combustion engine which is provided with means for preventing engine exhaust gases from being sucked into the suction chamber of the engine without loss in engine output or sacrificing the operating performance efficiency of the engine.

A still further object of the present invention is to provide an improved intake passageway for a rotary internal combustion engine which is simple in construction and economical to manufacture.

A yet further object of the present invention is to provide an improved intake passageway which can be readily installed in existing rotary internal combustion engines.

These and other objects and advantages of the present invention will become more apparent from the following description when taken in conjunction with the accompanying drawings in which like or corresponding component parts are designated by like reference numerals and in which:

FIGS. 5A, 5B and 5C are views illustrating operating conditions of the valve shown in FIG. 4;

FIG. 6 is a sectional view illustrating another preferred embodiment of the intake passageway according to the present invention; and FIG. 7 is a sectional view of another preferred embodiment of the intake passageway according to the present invention.

Figure 1:
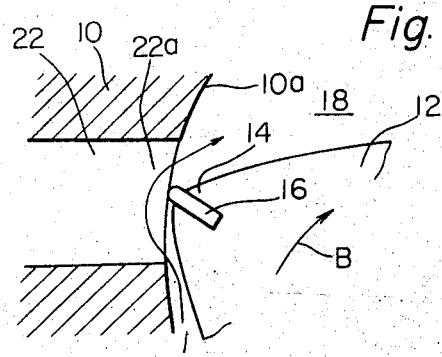
FIG. 1 is a sectional view illustrating a conventional intake passageway for a rotary internal combustion engine.

Referring now to FIG. 1, there is shown an example of a conventional rotary internal combustion engine. The rotary internal combustion engine comprises a housing 10 having formed therein an epitrochoidal internal wall 10a forming a cavity (a portion of which is shown in FIG. 1) A rotor 12 is rotatably disposed in the cavity of the housing 10 on an eccentric portion (not shown) of a shaft, though not shown. The rotor 12 has a peripheral surface with a plurality of circumferentially spaced apex portions 14, only one of which is shown in FIG. 1. Each of the apex portions 14 has an apex seal 16 which is in continuous sealing engagement with the epitrochoidal internal surface 10a of the housing 10 to form a plurality of working chambers 18 and 20 which vary in volume during rotation of the rotor 12 within the housing 10. In FIG. 1, the working chamber 18 is shown as commencing its intake phase, while the working chamber 20 is shown as terminating its exhaust phase. Designated by reference numeral 22 is an intake passageway which is formed in the housing 10 and which comunicates with the cavity (not identified) of the housing 10 for supplying an air-fuel mixture into the working chamber 18 when it commences its intake phase.

With this construction, as the rotor 12 rotates in the direction of arrow B in FIG. 1, the working chambers 18 and 20 are brought into communication with each other through an opening portion 22a of the intake passageway 22 when the apex seal 16 moves thereacross. Since, in this condition, there is a pressure difference between the working chamber 18 and the working chamber 20, that is, the pressure in the working chamber 18 commencing intake phase is lower than that of the working chamber 20 where the exhaust phase takes place, exhaust gases in the working chamber 20 are caused to flow into the working chamber 18. Under these circumstances, the air-fuel mixture supplied into the working chamber 18 is adversely affected by the exhaust gases entered therein so that the combustion efficiency is significantly deteriorated. As a result, not only the operating performance efficiency of the engine is decreased but also a large quantity of unburned exhaust gases are emitted to the atmosphere. This becomes more serious especially when the engine is operating at a light load.

In order to solve this problem, the present invention features the provision of a plurality of partitions which are positioned in the opening portion of the intake passageway substantially in parallel to the flow of air-fuel mixture passing therethrough with a view of preventing the exhaust gases in the working chamber terminating its exhaust phase from being sucked into the working chamber commencing the intake phase for thereby improving combustion efficiency of the engine.

Figure 2:
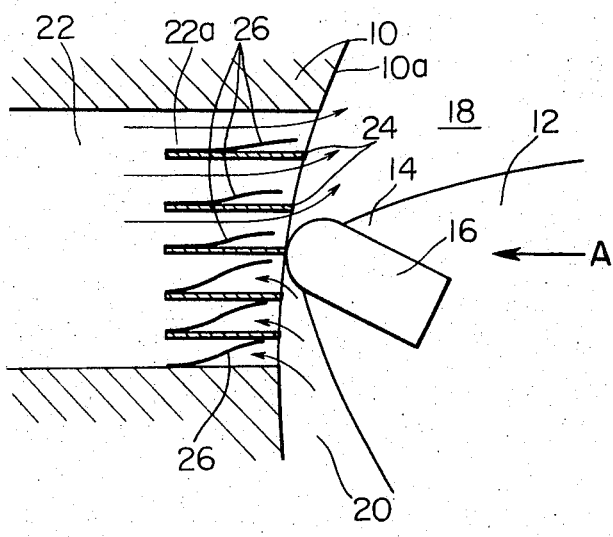
FIG. 2 is a sectional view illustrating a preferred embodiment of an intake passageway according to the present invention, the intake passageway being incorporated in a usual rotary internal combustion engine.

A preferred embodiment of the intake passageway to achieve the above-mentioned concept is schematically illustrated in FIG. 2, wherein like component parts are designated by same reference numerals as in FIG. 1. In this illustrated embodiment, a plurality of partitions 24 are disposed in the opening portion 22a of the intake passageway 22 substantially in parallel to the flow of air-fuel mixture passing therethrough. Valve means, shown as comprising a plurality of flexible valve members 26, are secured at one end to the plurality of partitions 24, respectively, and which are freely movable at the other end thereof to open and close the flow paths defined by the partitions 24, except that lowermost flexible valve member 26 is secured at its one end to the wall of the opening portion 22a. Each of these valve members 26 serves as a one-way check valve so that each permits the flow of air-fuel mixture into the working chamber 18 but prevents the flow of exhaust gases thereinto. With this arrangement, during rotation of the rotor 12, the exhaust gases in the working chamber 20 tend to flow into the working chamber 18 due to pressure difference therebetween. However, the flow of exhaust gases into the working chamber 18 is directed toward the intake passageway 22 through the partitions 24 and, thus, the direct flow of the exhaust gases into the working chamber 18 is prevented as seen from FIG. 2. Thus, the exhaust gases are prevented from being sucked into the working chamber 18 and, therefore, the deterioration of the combustion efficiency of the engine is prevented. It should be noted that the flow of air-fuel mixture into the working chamber 18 is not affected by the plurality of partitions 24 because the partitions 24 are located in the opening portion 22a of the intake passageway 22 substantially in parallel to the flow of air-fuel mixture passing therethrough and, thus, the operating performance efficiency of the engine is not sacrificed.

Figure 3A:
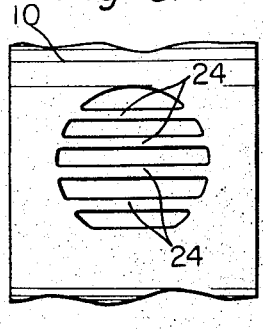
FIGS. 3A, 3B and 3C are schematic views illustrating various shapes of a peripheral port, as viewed in the direction of arrow A in FIG. 2, forming a part of the intake passageway according to the present invention.
Figure 3B:
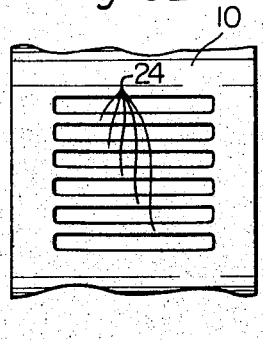
Figure 3C:
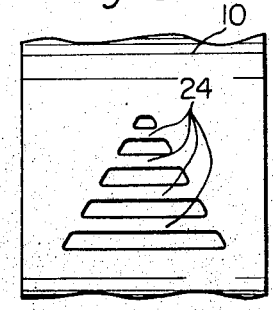

It should be understood that the group of the plurality of partitions 24 may be so arranged as to form around, square or conical cross section as shown in FIGS. 3A, 3B and 3C. It should also be noted that the pitch, width and number of individual partitions may be suitably selected independent of various design requirements.

Figure 4:
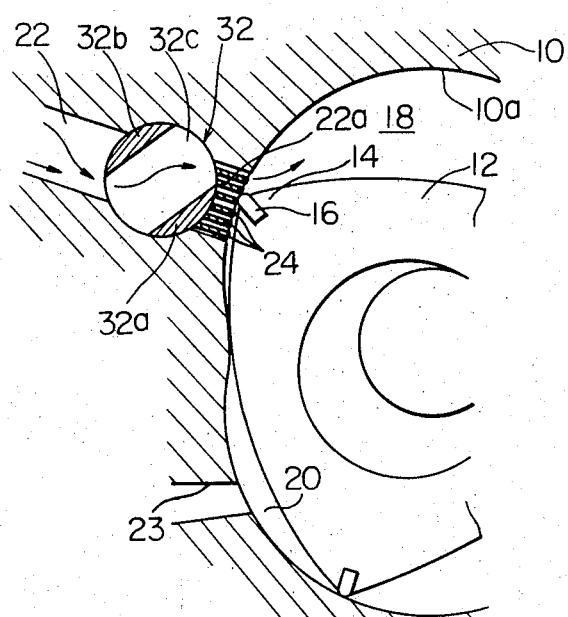
FIG. 4 is a sectional view of a still further preferred embodiment of the intake passageway according to the present invention.

FIG. 4 illustrates another type of valve means to be incorporated in the intake passageway according to the present invention. In this illustrated embodiment, the valve means is shown as comprising a rotary valve 32 which is mounted in the intake passageway 22 upstream of the plurality of partitions 24. This rotary valve 34 is round in cross section and has a pair of radially spaced axially extending wall portions 32a and 32b defining therebetween a passage 32c which is selectively brought into communication with the intake passageway 22. As shown in FIG. 4, the ends of partitions 24 are held in continuous engagement with the outer circumferential surface of the rotary valve 32 so that the opening portion 22a defined by the plurality of partitions 24 are selectively opened and closed in a manner as subsequently described. The rotary valve 32 thus constructed is utilized as a throttle valve and may be connected to a suitable control device so as to vary the effective cross sectional area of the opening portion 22a in dependence on the varying operating conditions of the engine. More specifically, the rotary valve 32 is rotated in such a manner that during light load operation of the engine, the rotary valve 32 retards the time instant at which the opening portion 22a opens thereby to decrease the degree of overlapping between the intake and exhaust passageways whereas, during full load operation of the engine, the rotary valve 32 advance the time instant at which the opening portion 22a opens thereby to increase the degree of overlapping between the intake and exhaust passageways for thereby satisfactorily discharging the engine exhaust gases from the working chamber 20.

Figure 5A:
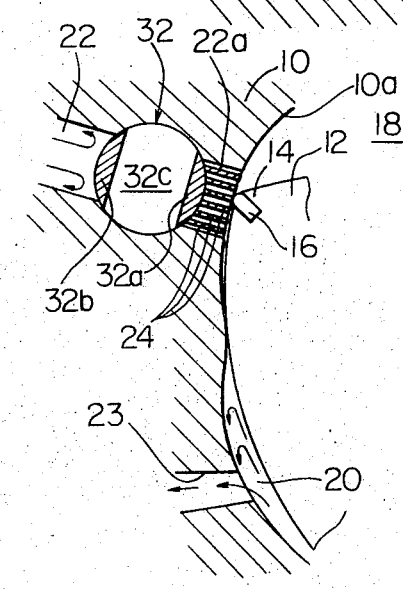

During braking action of the engine, the rotary valve 32 is rotated to assume a position shown in FIG. 5A. In this condition, the axially extending wall portion 32a of the rotary valve 32 closes the opening portion 22a and, therefore, the engine exhaust gases from the working chamber 20 are prevented from being sucked into the working chamber 18 by the plurality of partitions 24. The exhaust gases in the working chamber 20 are discharged from the exhaust passageway which is indicated at 23.

If the engine is operating at a partial load, the rotary valve 32 is slightly opened as shown in FIG. 5B. In this condition, the opening portion 22a is partly closed by the rotary valve 32 so that the exhaust gases are prevented from being sucked into the working chamber 18. The exhaust gases remaining in the trailing part of the working chamber 18 are also prevented from being sucked into the working chamber 18 because of the fact that the air-fuel mixture is flowing through the opening portion 22a at a high velocity.

If, furthermore, the engine is operating at full load, the rotary valve 32 is fully opened as shown in FIG. 5C so that the exhaust gases remaining in the opening portion 22a and the trailing part of the working chamber 18 are forced to flow in a direction as shown by an arrow b in FIG. 5C due to the inertia force of the air-fuel mixture passing through the opening portions 22a. Thus, the engine exhaust gases are prevented from entering into the working chamber 18 in a satisfactory fashion and, therefore, the air-fuel mixture supplied to the working chamber 18 is not affected by the exhaust gases. This is reflected by an improved operating performance efficiency of the engine and reduction in concentration of the unburned exhaust gases.

Another form of the valve means to be incorporated in the intake passageway according to the present invention is illustrated in FIG. 6. In the embodiment of FIG. 6, the valve means is shown as comprising a slidable valve plate 34 which is slidably accommodated in a recess 36 formed in the housing 10. The slidable valve plate 34 has formed therein an aperture 34a which is in communication with the intake passageway 22, and is held in abutting engagement with the ends of the partitions 24 so that the valve plate 34 can vary the effective cross sectional area of the opening portion 22a. The valve plate 34 is connected at its one end to an actuating lever 38 which is adapted to be rotatable in two directions as shown in FIG. 6. With this arrangement, if the actuating lever 38 is caused to rotate counterclockwise, then the valve plate 34 is moved upwardly as viewed in FIG. 6 thereby partially closing flow paths defined by the partitions 24. Under this circumstance, the engine exhaust gases are prevented from entering the working chamber 18 by the valve plate 34 and the partitions 24.

FIG. 7 illustrates another form of the valve means to be incorporated in the intake passageway of the present invention. In the illustrated embodiment of FIG. 7, the valve means comprises a plurality of butterfly valves 40 which are interposed in flow paths 42 defined by the plurality of partitions 24. The butterfly valves 40 are selectively opened and closed in accordance with the varying operating conditions of the engine by a suitable means (not shown) and function in a manner similar to those described hereinabove.

It will now be understood from the following description that the intake passageway embodying the present invention is capable of satisfactorily preventing the engine exhaust gases from being mixed with an air-fuel mixture to be supplied into the engine whereby not only the operating performance efficiency of the engine is increased but also the concentration of unburned compounds in the engine exhaust gases are eliminated.

It will also be noted that the intake passageway according to the present invention is simple in construction, economical to manufacture and ready to be installed in existing rotary internal combustion engines.

What is claimed is:

1. An intake passageway for a rotary internal combustion engine having a housing provided with an epitrochoidal internal wall therein forming a cavity and a rotor rotatably disposed in said cavity, said rotor having a peripheral surface with a plurality of apex portions each of which has a radially movable apex seal sealingly engaging with the epitrochoidal internal wall of said housing to define a plurality of working chambers in said cavity, said intake passageway comprising an intake passage means formed in said housing and having an opening portion communicating with said cavity for supplying an air-fuel mixture into one of said working chambers, a plurality of partitions positioned in said opening portion of said intake passage means substantially in parallel to the flow of said air-fuel mixture passing therethrough and extending to the peripheral wall of the working chambers in working cooperation with the apex seal to prevent engine exhaust gases from other one of said working chambers from being sucked into said one of said working chambers, and a valve means for controlling an effective cross sectional area of said opening portion of said intake passage means.

2. An intake passageway as claimed in claim 1, wherein said valve means comprises a plurality of flexible valve members which are secured at one end to said plurality of partitions, respectively, and which are freely movable at the other end to open and close flow paths defined by said plurality of partitions due to pressure difference across said valve members.

3. An intake passageway as claimed in claim 1, wherein said valve means comprises a rotary valve which is mounted in the intake passageway upstream of said plurality of partitions, said rotary valve being round in cross section and having a pair of radially spaced axially extending wall portions defining therebetween a passage which is selectively brought into communication with said opening portion.

4. An intake passageway as claimed in claim 1, wherein said valve means comprises a slidable valve plate which is slidably accommodated in a recess formed in said housing and which has formed therein an aperture communicating with said intake passage means, said valve plate being held in abutting engagement with respective ends of said plurality of partitions and slidable thereon for opening and closing flow paths formed by said plurality of partitions.

5. An intake passageway as claimed in claim 1, wherein said valve means comprises a plurality of butterfly valves which are respectively interposed in flow paths formed by said plurality of partitions and rotatable therein for opening and closing said flow paths.

* * * * *